United States Patent Office 2,797,137
Patented June 25, 1957

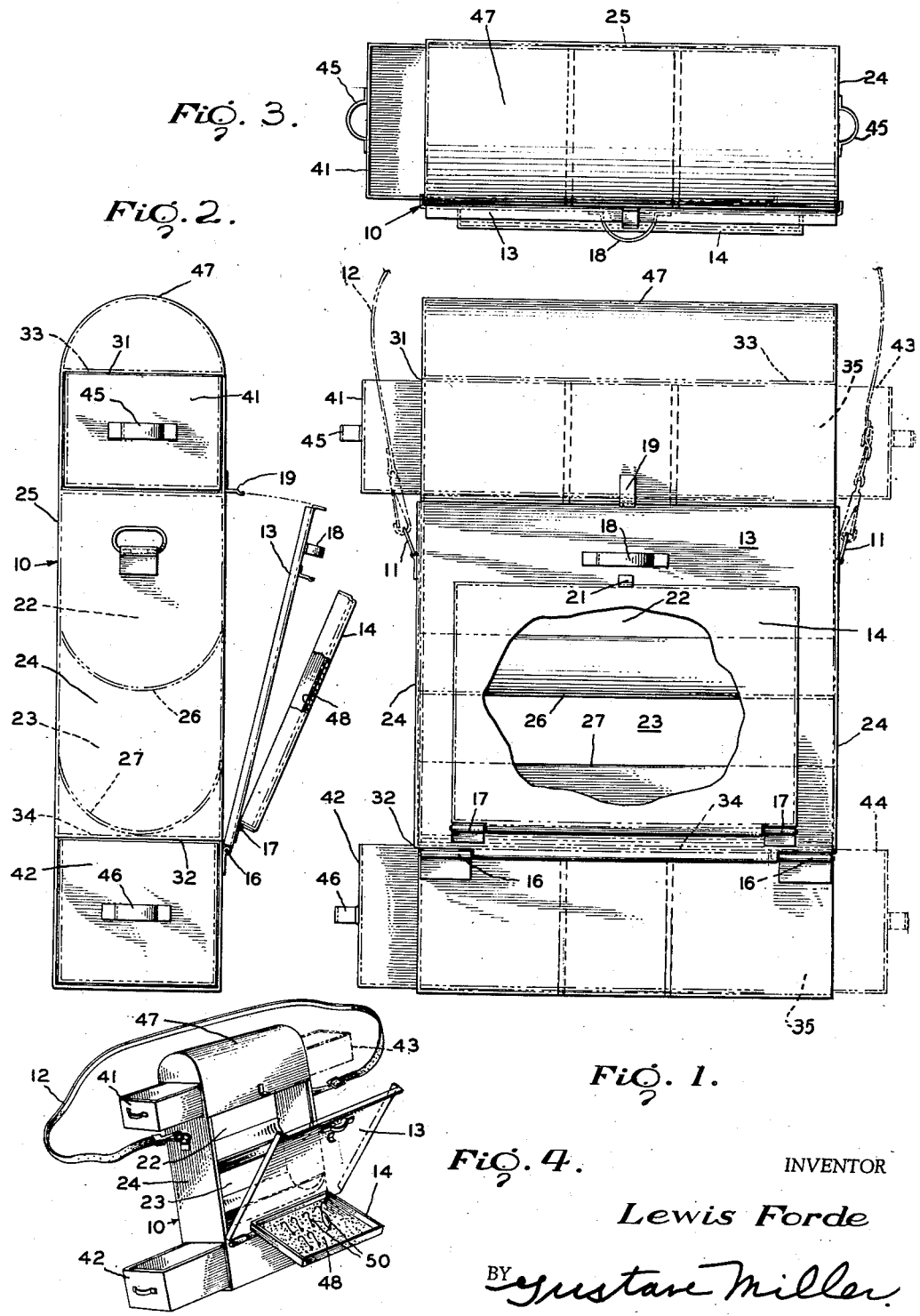

2,797,137

BAIT AND TACKLE BOX

Lewis Forde, Decorah, Iowa

Application September 4, 1953, Serial No. 378,631

1 Claim. (Cl. 312—283)

The present invention relates generally to sports equipment and specifically to a bait and tackle box for fishermen.

The principal object of the invention is to provide a conveniently shaped portable box for carrying damp bait such as worms in moss or earth, dry tackle such as plugs and lures, and sundry small hooks or other fishing devices. The present invention provides such a box as may be conveniently slung from a shoulder strap and worn without discomfort; presently available tackle boxes have annoyingly sharp edges which, as the fisherman proceeds in turbulent waters or from stepping stone to stepping stone, is exceedingly uncomfortable to wear next to the body, with sharp upper edges and angled upper corners.

Another object of the invention is to provide a bait and tackle box in which the lower portions of two drawers at least are of rounded conformation. Hooks and snells, plugs, poppers, and other sharply pointed tackle are continuously becoming tangled in any box which is tipped whether end wise or sidewise. Curving the bottom of the box in at least one direction permits loosely assembled articles to slide sideways with the movement of the box, obviating in at least part the inherent tendency of such articles to snag on each other as they would if they tumbled over each other in a sharply cornered or square box.

The present invention therefore provides at least two compartments or drawers in which the bottoms are curved in substantially a semicircle and have their sides nearly contiguous with the curved bottom. In a position approaching the horizontal, the tackle in a box of the design of this invention will merely slide over the back wall or over the closely fitting front door without excessive tumbling within and further entanglement of hooked articles loosely arranged.

A still further object of the invention is to provide a tackle and bait box having at least one closely fitting drawer for the stowage of a damp material which may be used to protect live bait without dripping of moisture while in an upright or carrying position.

A still further object is to provide on the face of the tackle box a readily accessible fly drawer or tray in which may be pinned or hooked the various sized flies and hooks, each easily available to the fisherman.

These and other objects and advantages of the invention are apparent with reference to the following description when taken in connection with the accompanying drawings, in which:

Fig. 1 is a front view in elevation showing a partial cutaway view of the interior.

Fig. 2 is an end view in elevation with the front doors partially opened.

Fig. 3 is a top view showing one drawer partially open, and

Fig. 4 is a view in perspective showing the drawers and doors partially open.

Referring in more particular to the drawing, in which like numerals indicate like parts throughout the several views, the invention comprises a box 10 of substantially square shape and constructed of such rigid materials as plastic, sheet metal, or the like. Riveted, soldered, or welded to each end at above the center of each end are loops 11 in which are secured the ends of shoulder strap 12. On the front of the box 10 are hinged two doors 13 and 14, the first door 13 totally closing the opening 15 in the front of box 10 and being hinged to the box by the pair of hinges 16, and the second door 14 hinged by the pair of hinges 17 to the front of door 13. Handle 18 on door 13, with latch 19, makes door 13 easily opened, while door 14, which is a shallow box is held by catch 21 and is opened by grasping the corner or edge. It will be seen that the door 13 opens to fully expose the compartments 22 and 23, each formed by the ends 24, back 25, and curved bottoms 26 and 27.

The ends 24 of box 10 have in the embodiments shown here two squared openings 31 and 32 which with upper partitions 33 and 34 form compartments 35 and 36 (see Fig. 1).

In Fig. 1 one embodiment of the invention shows four drawers 41 to 44 in each of compartments 35 and 36, the two drawers 43 and 44 being shown only in phantom view. In Fig. 3 is shown only one drawer 41, partially withdrawn, here shown in the compartment 35. Handles 45 and 46 on drawers 41 and 42 allow the drawers to be pulled from the compartments with ease.

In Figs. 2 and 4 it will be seen that the top of box 10 is curved as at 47. A felt pad 48 is shown in the partial cutaway view of Fig. 2, and is shown in Fig. 4 with hooks 50 attached.

The use and advantages of the invention are readily apparent from the foregoing description. The curved top 47 of the box fits snugly under an armpit when carried on the shoulder strap, the drawers in the ends may be used to contain dampened moss or earth in which worms or other bait is protected from the sun. The compartments with the curved bottoms may be temporary or permanent repositories for hooks and plugs or the like, and it is readily seen that articles placed on the curved bottoms will slide readily over the bottom and up either the front or back of the compartment when closed without tumbling on themselves. The door 14 is easily thumbed open and the fly pad easily disengaged of a desired lure.

While preferred embodiments of the invention have been here described and illustrated, the invention may be practiced with many modifications and changes without departing from the spirit and scope of the invention.

Having thus set forth and disclosed the nature of this invention, what is claimed is:

A bait and tackle box comprising a substantially rectangular container, relatively wide in relation to its depth, an arcuate false top extending along its width, a pair of fixed, superposed shelves formed by horizontally extending partitions within said container, each of said shelf partitions being semi-cylindrical in shape to form circular bottoms for compartments, each compartment having one of its longest walls meeting said bottom without interruption, a door extending across substantially the entire width of said container, and hinged at its bottom to open along a horizontal axis, a felt hook-containing pad pivotally connected along a horizontal axis to the outside of said door at a point adjacent the bottom of said door, and latch means for holding said door in closed position.

References Cited in the file of this patent
UNITED STATES PATENTS

| | | |
|---|---|---|
| 628,322 | Hoffmire | July 4, 1899 |
| 1,165,304 | Whittaker | Dec. 31, 1915 |
| 2,017,485 | Yawman | Oct. 15, 1935 |
| 2,155,967 | Carroll | Apr. 26, 1939 |
| 2,269,940 | Johnson | Jan. 13, 1942 |
| 2,344,800 | Butcher | Mar. 21, 1944 |